G. TRINKS.
Car Brake.
No. 9,655.
Patented Apr. 5, 1853.
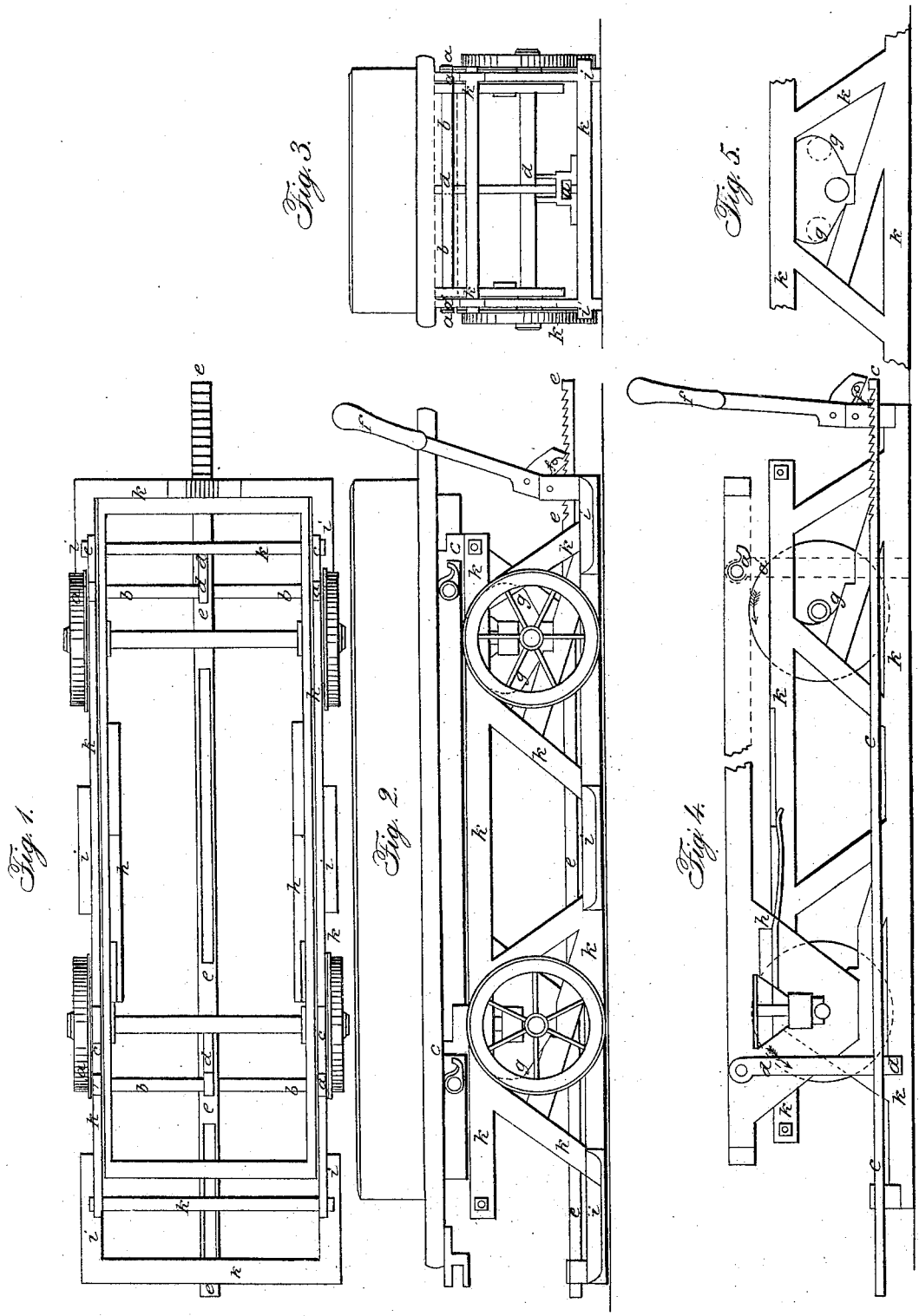

UNITED STATES PATENT OFFICE.

GREGOR TRINKS, OF JERSEY CITY, NEW JERSEY.

BRAKE FOR RAILROAD-CARS.

Specification of Letters Patent No. 9,655, dated April 5, 1853.

*To all whom it may concern:*

Be it known that I, GREGOR TRINKS, of Jersey City, in the county of Hudson and State of New Jersey, have invented certain new and useful Improvements in Car-Brakes; and I do hereby declare the following to be a full, clear, and exact description of the same, reference being had to the accompanying drawings, in which—

Figure 1, represents a top view of a four wheeled car; Fig. 2, represents a side view of the same; Fig. 3, represents an end view; Fig. 4, represents a side view with a portion of the frame removed, to show the position of the parts when the brake is applied, and Fig. 5, represents a manner of constructing the frame so that the axles of the car can move upon the shoe frame in either direction.

Similar letters in the several figures denote the same parts.

The nature of my invention consists in providing, and the manner of operating, a shoe or brake frame, the sides and ends of which are parallel to the truck frame, and placed either inside or outside of it, said frame being provided with shoes which stand over the line of the track, and so arranging the two frames, that their entire weight may be transferred from one to the other, and so that when the train is in motion the truck-frame shall carry the shoe-frame, and when the train is to be stopped, the shoe-frame shall support the truck and its frame, or such portion thereof as the emergency shall require, raising the wheels from the track, and allowing the shoes on the brake frame to slide on the rails, and thus retard the car or cars. And also, in gradually checking the momentum of the car or cars, without any sudden jar, when the brake is applied with even its whole force, by giving the truck-frame a longitudinal and vertical motion, independent of the shoe-frame, and allowing its axles to roll up on a curved inclined plane, thus causing it to exhaust its momentum in raising itself in said curved line, and which effectually prevents any sudden jar, or breakage of any of the parts, while at the same time, the whole weight of the truck is upon the brake frame, and applied to the stopping of the train—the wheels on the truck being left free from any strain, which prevents the bending or torsion of the journals, and the breakage of the wheels. Besides the stopping or braking of a train of cars, without applying any friction to the face of the wheels, keeps them true and round, while the wheels that are operated upon by a friction brake of any kind, soon wears them into a polygon, or many sided shape, when they become useless.

To enable others skilled in the are to make and use my invention, I will proceed to describe the same with reference to the drawings.

The shoe frames $k$, $k$, may be arranged outside or inside of any ordinary truck or car frame, and should be made of wood or iron sufficiently strong to support the weight of the trucks or car when thrown upon them. The shoe frames are provided with stationary catches $c$, $c$, $c$, $c$, into which the cam shaped hooks $a$, $a$, $a$, $a$, on the ends of the oscillating shafts $b$, $b$, catch, and support said shoe-frame, when the brake is not required or applied. The shafts $b$, $b$, are arranged and supported,—one on each end of the truck of car frame, and from each of said shafts an arm or lever $d$, extends down and is hinged, or otherwise attached, to the rack bar or rod $e$, so that as said bar or rod $e$, is moved back or forward by means of the lever $f$, an oscillating motion will be given to the shafts $b$, $b$, by or through the arms or levers $d$, $d$, and which oscillation throws the cam hooks $a$, $a$, $a$, $a$, into, or out of, connection or operation with the stationary catches $c$, $c$, $c$, $c$, aforesaid on the shoe-frame, and raises up said shoe frame onto the truck frame, or lowers it down so that the shoes $i$, $i$, thereon, and of which there may be any suitable number, shall come in contact with or slide upon the rails.

In the application and use of this brake, the wheels themselves perform no function, they neither touch the rail nor the shoe, nor are they in contact with the friction brake; yet at the same time that the wheels are raised from the rails, the shoes and their flanges are so diffused over that portion of the track on which the car would stand, as to preclude any possibility of the car being thrown from the track by any lateral motion. It has been found by experience, that where the wheel runs up onto the shoe, the whole strain in checking the momentum of the car or train, comes upon the journals and wheels, and generally bending or breaking one or both; besides, as the wheel must slide or slip somewhat on the shoe under this immense friction, their faces are worn into a series of straight lines, which in a very short time renders them useless. I remedy this by removing the weight entirely from the journals and wheels, and by throwing it entirely onto the shoe frame, the wheels and axles being free to turn as before the brake is applied. But to further prevent any concussion or breakage by the sudden stopping of the train, to avoid unforeseen danger, I arrange on said shoe frame, curved inclined planes $g$, $g$, up which the axles of the truck may roll, and thus however suddenly the brake may be applied, the trucks, while their entire weight is applied to the stopping of the car, have a motion in a curved line horizontally and vertically, on said curved planes, which eases their motion, without the least jar or danger of breakage. To aid in gradually checking the ascent of the trucks on these planes, I place on the truck frame springs $h$, Fig. 4 (one only being represented, the points of which rest under the shoe frame, so that as the truck frame rises, the springs will be compressed and their recoil gradually draw it down again. The whole of the weight of the car therefore may be suddenly applied, and with so much force as to instantly, almost, stop the shoe frame, and yet the car by the peculiarities of its connection therewith, will have a swinging motion, being as it were suspended like a swing on the shoe or brake frame; and the train may be stopped without danger to the passenger, or breakage to any of its material parts. The lever $f$, is provided with a pawl working into the rack of the rack bar $e$, so as to throw the brake into, and hold it in action, or to throw it out of action as the case may be. This may be done however, by any other well known device placed in convenient position for the operator, and the whole train may be so united as that one operator may throw all the brakes into or out of action at will.

I am aware that shoes have been suspended to the car-frame in such manner that, in case of accident, or for stopping of the train, the wheels may run up onto said shoes, and the weight of the car on said shoes operate or assist to stop the train; but this is an uncertain and dangerous operation, and often results in the breaking of the wheels or bending of the journals or axles—the car being entirely dependent upon the motion of the shoes, and the whole shock being received by the car.

I am also aware of the nature and operation of the so termed "safety car or truck," which is only used in ascending or descending inclined planes, and could not be used in ordinary cases, as it does not admit of the reversing of the train. My invention is entirely different from these, for while I apply the weight of the car to the shoes, I do not stop the wheels from running, neither do I suddenly check the truck or car, it having by its momentum an easy motion in a curved line independent of the motion of the shoe frame, and I do not endanger the breaking or injuring of any of the material parts of the car or truck.

Having thus fully described the nature of my invention, what I claim therein as new and desire to secure by Letters Patent is,

1. The so combining the shoe frame with the ordinary truck or car, as that it may be raised and lowered by the operation of the brake lever, so as to be carried by the truck, or to receive the weight of the car to aid in applying the brakes, and so that the wheels shall not come in contact with the shoes, but be free to turn, substantially as described.

2. I also claim giving the truck or car a motion independent of the shoe or brake frame, by means of the curved inclined planes or their equivalents on the shoe frame, up which the axles of the trucks may roll, by an easy swinging motion, while its entire weight continues to aid in applying the shoe or brake to the surface of the rails, substantially as herein described.

GREGOR TRINKS.

Witnesses:
DAVID BEDFORD,
LEWIS G. HANSEN.